July 1, 1924.
H. BECKER
LATHE
Filed Aug. 5, 1921
1,499,633
3 Sheets-Sheet 1
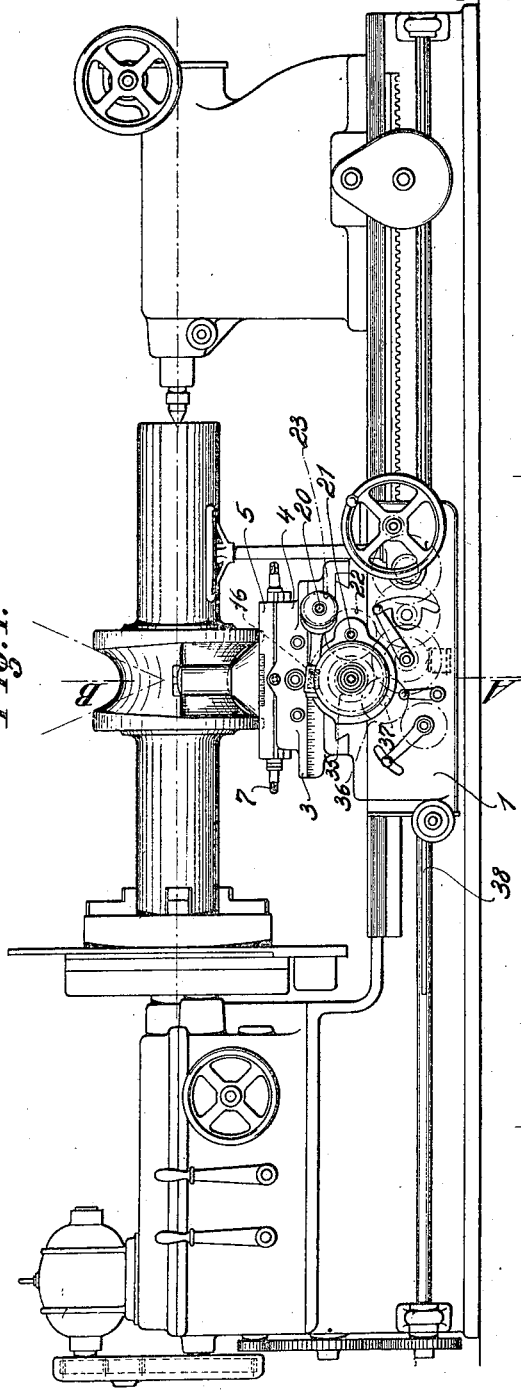
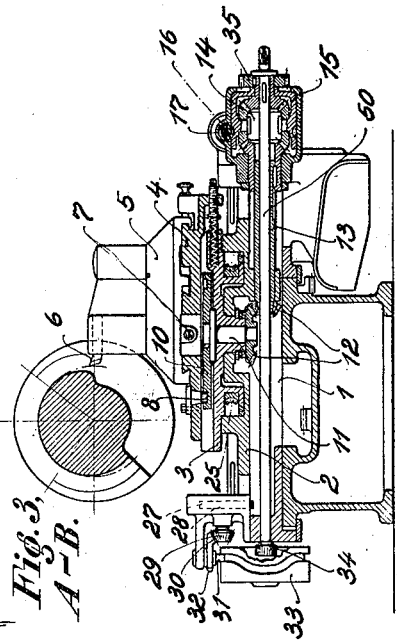
Inventor
Hans Becker

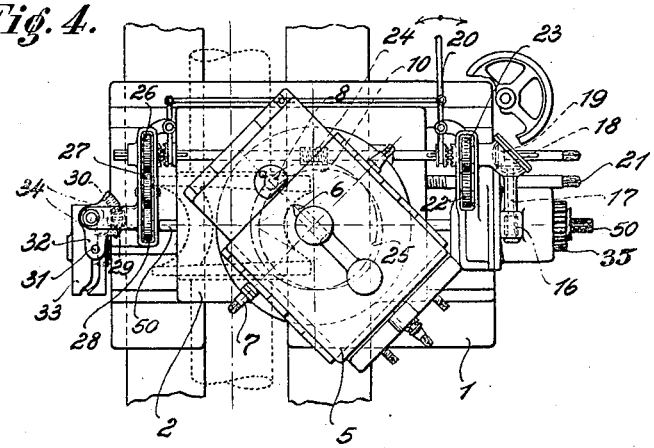
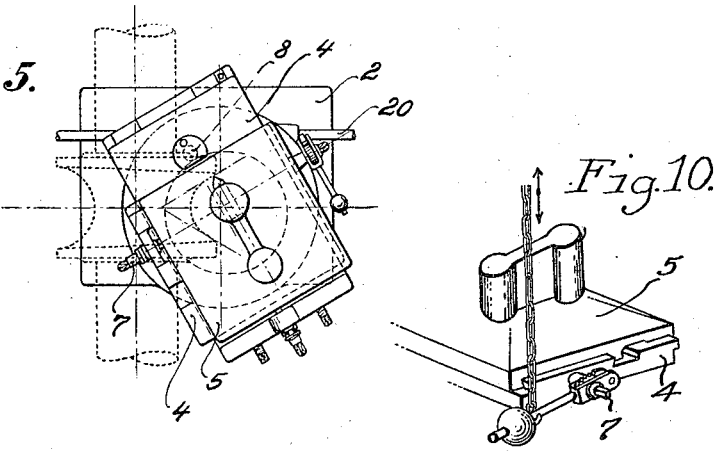
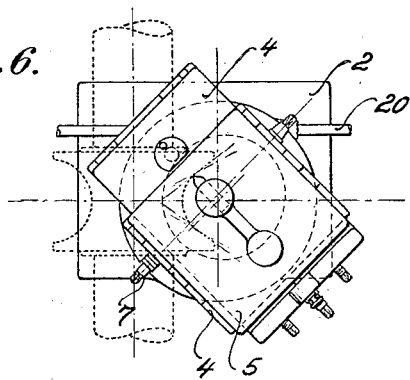

July 1, 1924.   H. BECKER   1,499,633
LATHE
Filed Aug. 5, 1921   3 Sheets-Sheet 3
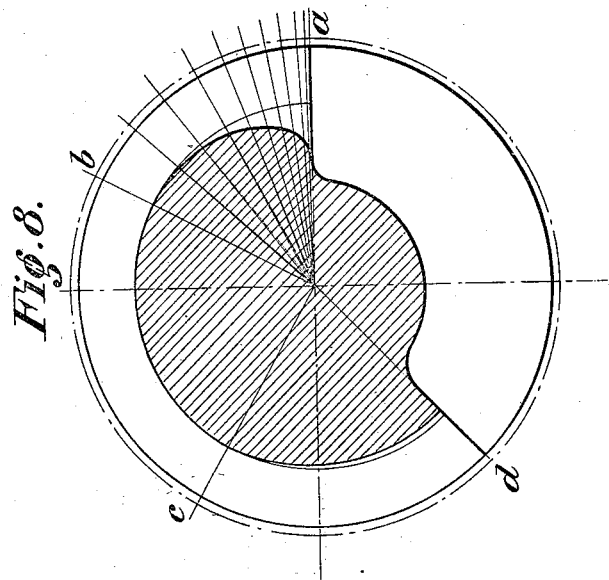
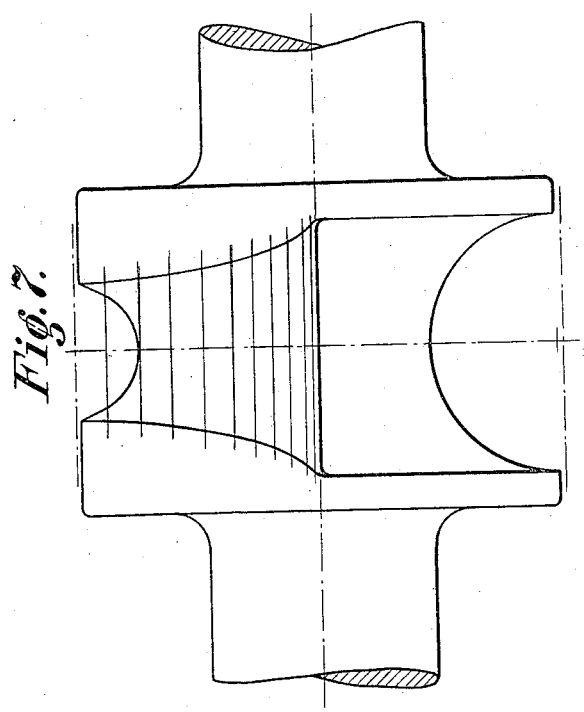
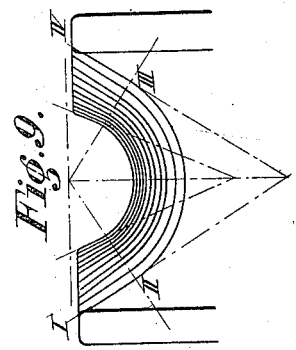
Inventor.
Hans Becker Patented July 1, 1924.

1,499,633

UNITED STATES PATENT OFFICE.

HANS BECKER, OF DUSSELDORF, GERMANY.

LATHE.

Application filed August 5, 1921. Serial No. 490,058.

*To all whom it may concern:*

Be it known that I, HANS BECKER, a citizen of the German Republic, residing at Dusseldorf, Germany, have invented certain new and useful Improvements in Lathes, of which the following is a specification.

My invention refers to lathes and more especially to a device to be used in connection with lathes which moves the cutting tool in such manner as to enable eccentric bodies of varying eccentricity at different cross-sections to be turned automatically.

For shaping rolls having partly cylindrical and partly conical profiles, such as are used for instance in tube rolling mills working in accordance with Perrins' process several machine tools operating in different ways have hitherto been required.

The body of the roll, the necks and cylindrical polishing passes were shaped by means of a lathe specially designed for this purpose. The conically arranged drawing and releasing profile of the tapering pass were first turned on the lathe and then milled on a milling machine specially constructed for this purpose. The taper or slant of the cylindrical portion of the groove of about 25 degrees, as well as the corresponding taper of the drawing and releasing portion of the groove of about 30 degrees were produced by hand by means of pneumatic hammers or grinding wheels.

The machines and appliances required for making or shaping such rollers are very expensive, moreover, the desired roll opening could only be produced approximately and inaccurately and the transfer of the rolls from one machine tool to the other occupied much time, thereby increasing the cost of manufacture. The process of milling the passes on the special milling cutter could only be entrusted to a highly skilled workman. Moreover, owing to the hardness of the material and the difficulty or impossibility of applying a strong tool holder, the surplus metal could only be cut off in the form of thin chips.

The novel device according to the present invention renders it possible to turn the rolls completely and accurately by means of a single machine.

According to the present invention the tool is fed forward in a straight line or a curve under the control of an eccentric disc or cam corresponding to the eccentric groove.

In the drawings affixed to this specification and forming part thereof a device embodying my invention is illustrated by way of example. In the drawings—

Fig. 1 is a front view of the new device as applied to a lathe;

Fig. 2 is a side view;

Fig. 3 is a section along line A—B of Fig. 1, and

Fig. 4 is a plan;

Figs. 5 and 6 are similar views showing different positions of the cutting tool and the eccentric roll;

Figs. 7, 8 and 9 are a front view, section and partial plan respectively, of an eccentric roll.

Figure 10 is a perspective view of the slide rest.

Referring to the drawings, 1 is the lathe carriage carrying a transversely movable slide 2, on which is pivotally mounted a platform 3 provided with a guide for a compound slide rest 4, 5 carrying the tool 6. The upper part 5 of the slide rest can be adjusted by a manually operated spindle 7, and the lower part 4 carries a roller or stud 8 which runs in the groove of an eccentric disc or cam 10 mounted on a stud 11 coaxial with the pivoted platform 3, which stud receives continuous uniform motion by means of bevel wheels 12 from a hollow shaft 13. On the latter is mounted a differential gear 14, whose intermediate wheels are housed in a casing 15, which by means of a worm 16 carrying on its axle 17 a bevel wheel 18 is connected with a bevel wheel 19 mounted on a shaft 20.

By means of the spindle 21 serving to operate the slide 2 the shaft 20 may be driven through the intermediary of spur-wheels 22, 23. On the shaft 20 is mounted also a worm 24 meshing with a worm wheel 23, which is connected with the pivoted platform 3.

The grooved shaft 20 extends into a toothwheel 26, which is connected by intermediate wheels 27, 28 with a bevel-wheel 29, into which gears a toothed segment 30, with which is combined an arm 32 carrying a roller 31. The roller engages with a grooved disc 33 connected by tooth-wheels 34 with the shaft 50. A tooth-wheel 35 connected with the loose bevel-wheel of the differential gear gears into a tooth-wheel on the shaft 37, which is driven by tooth-wheels at a suitable ratio from the driven grooved shaft 38 of the lathe.

This mechanism is intended to shape for instance the eccentric roll represented in Figs. 7, 8 and 9.

The eccentric shape is produced by causing the cutting tool 6 to move forward and backward once during a revolution of the workpiece by means of the constantly revolving grooved disc 10. At the same time the cutting tool receives a curvilinear motion corresponding to the profile of the groove by means of the worm 24 and worm-wheel 25, which are driven by the tooth-wheels 22, 23 from the gear box of the lathe carriage 1. Now as with the swing of the cross slide the roller 8 is also shifted in relation to the grooved disc 10, so that the latter can no longer impart to the cutter the same radial motion, it is necessary that the curved disc should travel with the roller 8.

Consequently the grooved disc 10 must receive in addition to its uniform rotary motion a swinging motion corresponding to the feed motion of the cutter. This motion is produced by the differential gear, inasmuch as the turning of the worm 24 by means of the bevel wheels 19, 18 and the worm 16 has an influence on the differential casing 15 with the intermediate wheels and correspondingly on the shaft 13 and the grooved cam disc 10.

By a suitable choice of the ratios of transmission of these mechanisms the motion of the cutter 6 and that of the cam disc 10 are made to correspond. During the curvilinear feed motion of the cutter 6 it receives also the constant radial forward and return-motion by the cam disc.

When the arched portion of the groove profile has been shaped in this manner, a coupling piece connecting the tooth-wheel 23 with the shaft 20 is released and the tooth-wheel 26 connected with the shaft 20 by a coupling, after the cross-slide has been adjusted by turning the shaft 20 by hand so as to correspond with the slanting portion adjoining the arched portion of the profile on one side.

The spindle 7 is then driven by a ratchet (idler) so that the cutter together with the top-slide 5 receives its feed motion in the adjusted oblique position. The inclination or taper, however, is not uniform on the whole circumference of the profile, but changes several times, as mentioned above. The automatic adjustment of the cross-slide for these different oblique positions during one revolution of the piece of work is effected by means of the grooved disc 33, which also revolves once during the same time. Consequently the tooth-wheel 29 in accordance with the shape of the groove is turned forward and backward by the tooth segment 30, and by means of the tooth-wheels 28, 27, 26, the shaft 20 is set in motion, together with the worm 24 which swings the platform 3 carrying the cross-slide. In this manner first one side and then the other side of the profile is shaped. In accordance with the position of the cutting tool in relation to the axis of rotation of the platform 3 the cutting tool is caused to move in a curve of smaller or greater radius.

The construction of the machine admits also any ordinary turner's work.

I claim:

1. In a device of the kind described in combination, a lathe carriage, a compound slide rest adapted to turn in a horizontal plane, a cutting tool carrier on said slide rest, a rotary cam disc and gearing for imparting to said slide rest a reciprocating forward and return motion, and a worm gear for imparting to it an angular motion.

2. In a device of the kind described in combination, a lathe carriage, a compound slide rest comprising an upper and a lower part and being adapted to turn in a horizontal plane, a cutting tool carrier on the upper part of said slide rest, a rotary cam disc adapted to impart to said slide rest a reciprocating forward and return motion, a worm gear adapted to impart to said slide rest an angular motion and means for imparting to said cam disc an additional motion in correspondence with the reciprocating motion of said slide rest.

3. In a device of the kind described in combination, a lathe carriage, a compound slide rest comprising an upper and a lower part and being adapted to turn in a horizontal plane, a cutting tool carrier on the upper part of said slide rest, a rotary cam disc adapted to impart to the upper part of said slide rest a reciprocating forward and return motion, a worm gear adapted to impart to said slide rest an angular motion and means for imparting to said cam disc an additional motion in correspondence with the reciprocating motion of the upper part of said slide rest.

In testimony whereof I affix my signature.

HANS BECKER.